United States Patent
Douglas et al.

[19]

[11] Patent Number: 6,055,375
[45] Date of Patent: Apr. 25, 2000

[54] SELF-DEVELOPING CAMERA

[75] Inventors: Lawrence M. Douglas, So. Easton; John P. Kirby, Peabody; Kenneth J. Launie, Cambridge; Frank S. Silveira, Wilmington, all of Mass.

[73] Assignee: Polaroid Corporation, Cambridge, Mass.

[21] Appl. No.: 09/018,375

[22] Filed: Feb. 4, 1998

[51] Int. Cl.[7] .................................................. G03B 17/50
[52] U.S. Cl. .................................. 396/33; 396/40; 396/36
[58] Field of Search ..................... 396/31, 33, 36, 396/37, 39, 387, 40, 6; 242/528; 348/216, 270, 221, 227, 273, 366, 371

[56] References Cited

U.S. PATENT DOCUMENTS

| | | | |
|---|---|---|---|
| 2,496,630 | 2/1950 | Land et al. | 396/36 |
| 2,930,301 | 3/1960 | Land et al. | 396/32 |
| 3,350,990 | 11/1967 | Finelli et al. | 396/33 |
| 3,618,493 | 11/1971 | Erlichman | 396/40 |
| 3,672,275 | 6/1972 | Johnson | 396/32 |
| 3,852,781 | 12/1974 | Erlichman | 396/33 |
| 3,911,452 | 10/1975 | Ueda | 396/32 |
| 3,967,297 | 6/1976 | Eloranta et al. | 354/83 |
| 4,044,365 | 8/1977 | Pizzuti et al. | 396/32 |
| 4,068,244 | 1/1978 | Douglas | 396/37 |
| 4,070,684 | 1/1978 | Ettischer et al. | 396/37 |
| 4,165,931 | 8/1979 | Fauth et al. | 396/40 |
| 4,172,647 | 10/1979 | Gold | 396/39 |
| 4,194,821 | 3/1980 | Stemme et al. | 396/37 |
| 4,194,825 | 3/1980 | Fauth | 396/33 |
| 4,332,451 | 6/1982 | Ichii | 396/31 |
| 4,341,857 | 7/1982 | Aoki | 430/207 |
| 4,375,324 | 3/1983 | Holmes | 396/582 |
| 4,505,560 | 3/1985 | Kozai | 396/36 |
| 4,518,235 | 5/1985 | Reed et al. | 396/33 |
| 4,542,973 | 9/1985 | Johnson et al. | 354/413 |
| 4,660,951 | 4/1987 | Reed et al. | 396/33 |
| 4,751,536 | 6/1988 | Ohmura et al. | 396/6 |
| 4,831,398 | 5/1989 | Nakayama et al. | 396/387 |
| 4,833,495 | 5/1989 | Ohmura et al. | 396/387 |
| 4,855,774 | 8/1989 | Ohmura et al. | 396/6 |
| 4,884,087 | 11/1989 | Mochida et al. | 396/6 |
| 4,954,857 | 9/1990 | Mochida et al. | 396/6 |
| 4,962,398 | 10/1990 | Sorg et al. | 396/33 |

(List continued on next page.)

FOREIGN PATENT DOCUMENTS

| | | | |
|---|---|---|---|
| 26 54 500 | 6/1978 | Germany | G03B 17/52 |
| 28 37 331 | 3/1980 | Germany | G03B 17/52 |

OTHER PUBLICATIONS

PCT International Search Report for PCT/US 97/05083 (Form PCT/ISA/210 and PCT/ISA/220).

*Primary Examiner*—D. Rutledge
*Attorney, Agent, or Firm*—Leslie Payne

[57] ABSTRACT

A photographic apparatus for use with self-developing film wherein the apparatus comprises a light-tight housing assembly having a film unit exit for allowing the film units to exit the housing assembly; an exposure control assembly including a shutter button; the exposure control assembly includes a biased carriage assembly movable between ambient, strobe and strobe charge positions in response to manual displacement thereof; a spread roller assembly including spread rollers for spreading the processing fluid in the film units; a manually operable drive mechanism is mounted in the housing assembly for bidirectional linear movement between extended and retracted positions and carries a pick for engaging and advancing a topmost film unit of the film stack into the nip, and for rotatably driving the spread roller member in response to pulling of the drive mechanism by an operator to process the film unit and eject the same from the exit; and, an interlocking assembly cooperates with the shutter button and the drive mechanism to prevent the drive mechanism from moving until the shutter button is actuated, and preventing the drive mechanism from being reinserted into the housing assembly until the drive mechanism has been pulled sufficiently so that a film unit has been processed by the spread roller member and exits the housing assembly.

13 Claims, 12 Drawing Sheets

U.S. PATENT DOCUMENTS

| | | | |
|---|---|---|---|
| 5,103,249 | 4/1992 | Keene | 396/3 |
| 5,218,391 | 6/1993 | Kanai et al. | 396/40 |
| 5,235,364 | 8/1993 | Ohmura et al. | 396/176 |
| 5,255,041 | 10/1993 | Lyon et al. | 396/6 |
| 5,339,127 | 8/1994 | Muramatsu | 396/6 |
| 5,361,111 | 11/1994 | Yamashina et al. | 396/6 |
| 5,453,804 | 9/1995 | Norris et al. | 396/31 |
| 5,491,526 | 2/1996 | Shimizu | 396/40 |
| 5,608,477 | 3/1997 | Shimizu et al. | 396/33 |
| 5,838,997 | 11/1998 | Douglas | 396/33 |

SELF-DEVELOPING CAMERA

CROSS-REFERENCE TO RELATED APPLICATION

This application is related to non-provisional U.S. patent application Ser. No. 08/826,237, filed Mar. 27, 1997, U.S. Pat. No. 5,838,997.

BACKGROUND

The present invention relates generally to self-developing photographic cameras. More particularly, it relates to low-cost cameras of the above type that are manually operable as well as simplified in construction and operation.

Over the years a wide variety of cameras employing self-developing film have enjoyed widespread consumer and commercial success because of the immediacy of the photographic results. Many of such cameras are typically provided with electric motors and associated geared transmissions which essentially operate to drive each exposed film unit from an exposure station to the camera's exterior, as well as drive a camera processing system for processing such film units prior to each one emerging from the camera. The automatic film advancing and processing systems while providing for ease and reliability of operation add to the overall cost and complexity, as well as present packaging issues relating to compactness. Due to recent advancements in the field of photography, and in particular single-use cameras, it is desirable to provide for low-cost, self-developing cameras having single-use capabilities. It is, therefore, desirable to provide such cameras, whereby the costs and complexity, particularly associated with automatic film advancing and processing systems, are reduced. One example is to provide such cameras with manually operable systems. One example is described in U.S. Pat. No. 3,852,781. Another effort is described in the last-noted copending U.S. patent application, Ser. No. 08/826,237, U.S. Pat. No. 5,838,997; which application is incorporated herein by reference and made a part hereof. Despite the existence of known manual processing systems including the improvements noted in said application, there exists, nevertheless, a continuing desire to improve on all facets of such cameras; particularly in terms of enhancing the ease and reliability of use, as well as the compactness of overall architecture.

SUMMARY OF THE INVENTION

According to the present invention, provision is made for a photographic apparatus for use with self-developing film in which the apparatus includes a light-tight housing assembly having a film unit exit opening. Provision is made for an exposure means in the housing assembly for effecting an exposure cycle for exposing successive ones of a plurality of the film units in the camera. The exposure means includes a shutter button. Provision is made for spreading means including a spread roller and an opposing spreading structure defining a nip through which each one of the film units passes. The spread roller is rotatable for advancing and processing individual film units through the nip and towards the exit opening. A manually operable drive mechanism is mounted in said housing for bidirectional linear movement and carries a film pick at a proximal end thereof for engaging and advancing a topmost film unit of the film stack into the nip, and for rotatably driving the spread roller in response to pulling of the drive mechanism by an operator to process the film and eject the same from the exit opening. An interlocking assembly cooperates with the shutter button and the drive mechanism to prevent the latter from moving until the shutter button is actuated, and preventing the drive mechanism from being reinserted into the housing assembly until the drive mechanism has been pulled sufficiently so that a film unit has been processed by the spread roller and exited through the opening.

In an illustrated embodiment, the interlocking assembly holds the shutter button in its actuated condition until the film unit exits the opening in response to pulling of the drive mechanism. In this illustrated embodiment, provision is made for the interlocking assembly advancing a film counter in response to movement of the drive mechanism.

In another illustrated embodiment, provision is made for means for widening the spread roller nip so as to reduce the biasing force acting on the film unit as the latter passes through the nip.

It is an object of the present invention to provide for improved photographic apparatus and methods, especially for use with self-developing film which is simplified in construction and assembly and, therefore, low in cost as well as reliable in operation; particularly manual operation and processing.

The above and other objects and scope of the present invention will become apparent following a reading of a detailed description thereof when taken in conjunction with the accompanying drawings in which like reference numerals indicate like structure throughout the several views.

DETAILED DESCRIPTION

Figure 1:
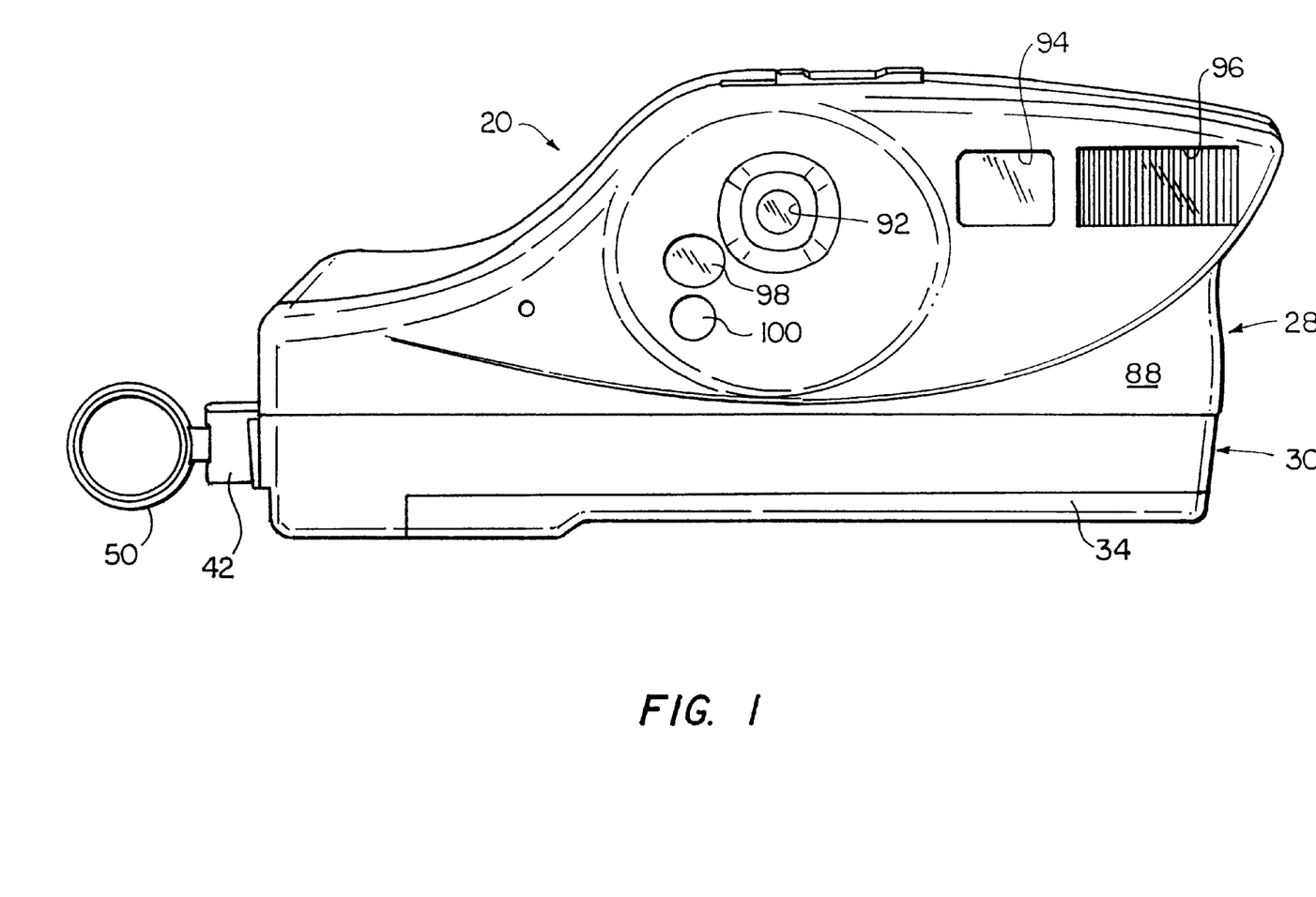
FIG. 1 is a front elevation view of a photographic apparatus made in accordance with the present invention.
Figure 2:
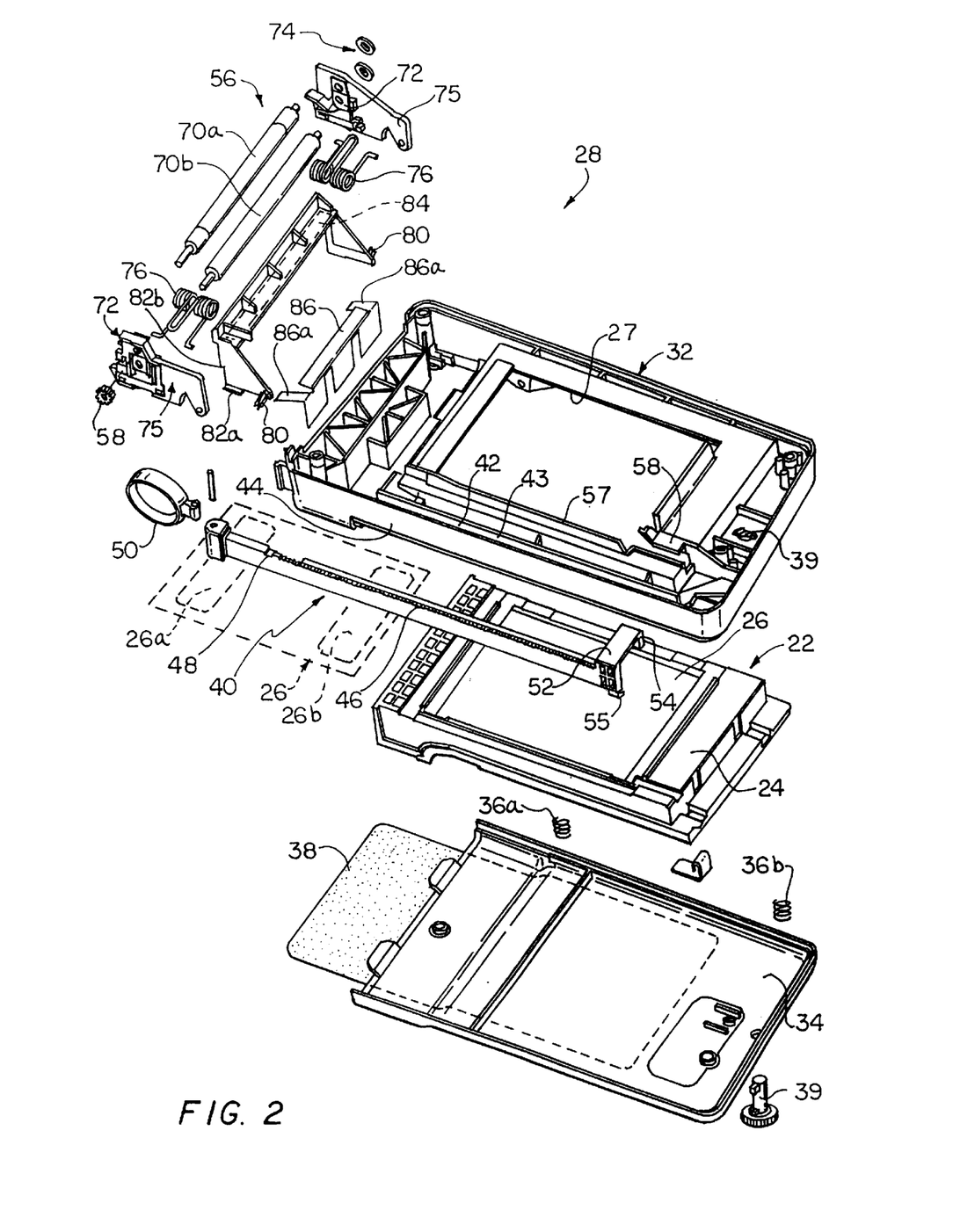
FIG. 2 is an exploded perspective view illustrating some of the components forming a lower camera assembly.
Figure 3:
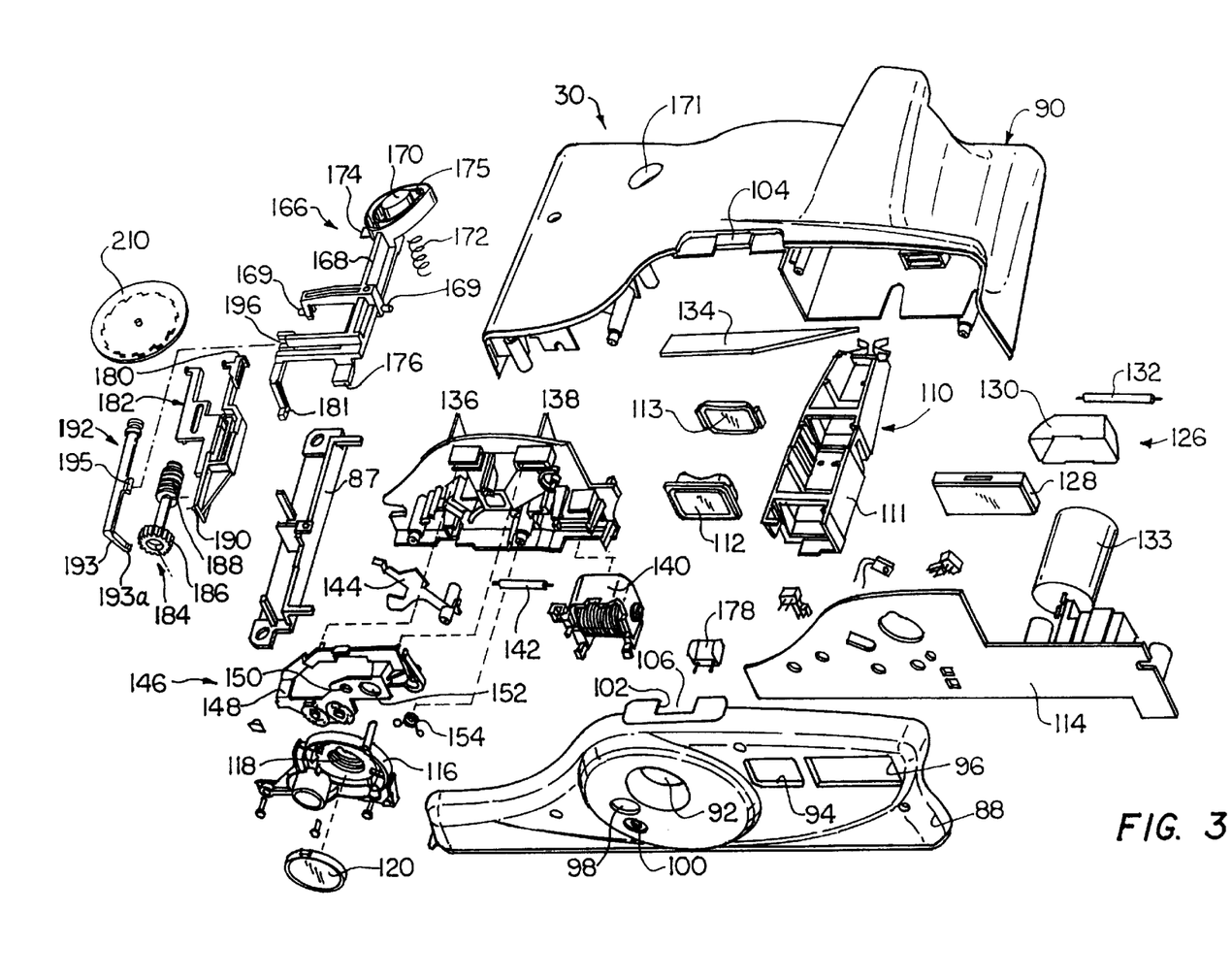
FIG. 3 is an exploded perspective view illustrating some of the components forming an upper camera assembly.

Referring now to drawings in detail there is shown in FIGS. 1–3, one preferred embodiment of a camera 20 which cooperates with a photographic film assemblage 22 of the self-developing type that is commercially available from Polaroid Corporation and are provided with a pod 26a of processing fluid at a leading end and a trap 26b at a trailing end. The film assemblage 22 is similar to the type described in commonly assigned U.S. Pat. No.: 4,972,218. Essentially, the assembly 22 includes a film cassette 24 containing a plurality of stacked film units 26 of the self-developing type (one of which is shown), as well as a battery and pack spring (not shown). The film units 26 are collectively stacked in the cassette 24, whereby successive ones of each top most film units in the stack are presented to the focal plane and exposed through aperture 27. Although the present embodiment discloses that the camera is re-loadable, it is clearly contemplated that the film assemblage 22 could be pre-loaded; thereby defining a lens-fitted film package of the so-called single-use type.

Figure 5:
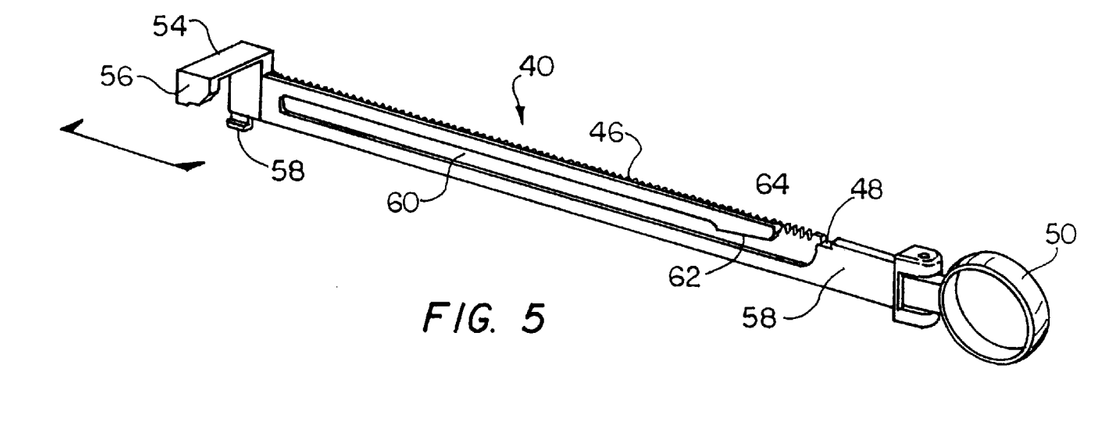
FIG. 5 is a perspective view illustrating a film drive mechanism of the present invention.

FIGS. 2 and 3 depict lower and upper camera housing assemblies 28 and 30; respectively. The lower housing assembly 28 includes among other features a base block member 32 and a door assembly 34. The film cassette 24 is loaded within a cassette receiving well 25 (Fig. in the base 32 and is urged by spring elements 36 a, b mounted on the door assembly 34 to an appropriately secure position. A rectangular strip 38 carrying adhesive on one surface thereof secures the door assembly 34 to the base 32, so that the door assembly can pivotally move between open and closed positions for allowing insertion and removal of the film cassette 24. The strip also serves as an indicia carrying label. A variety of approaches, such as a thumbscrew 39 (FIG. 5) or latch (not shown) can releasably secure the door assembly 34 to the base 32. Also, it is contemplated that the door is permanently affixed to the camera base, whereby the camera can function as a so-called single-use type.

Figure 12:
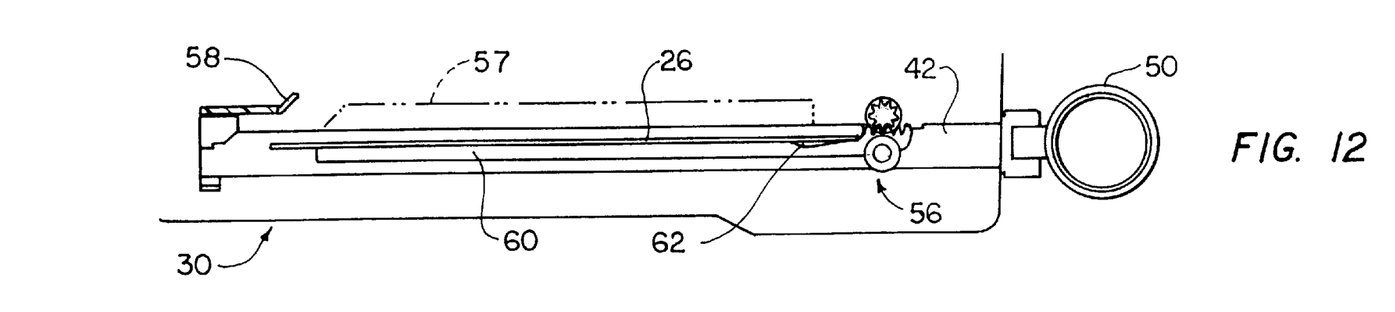
FIGS. 12–14 illustrate various positions of the drive rack mechanism relative to a film unit passing through spread rollers.
Figure 13:
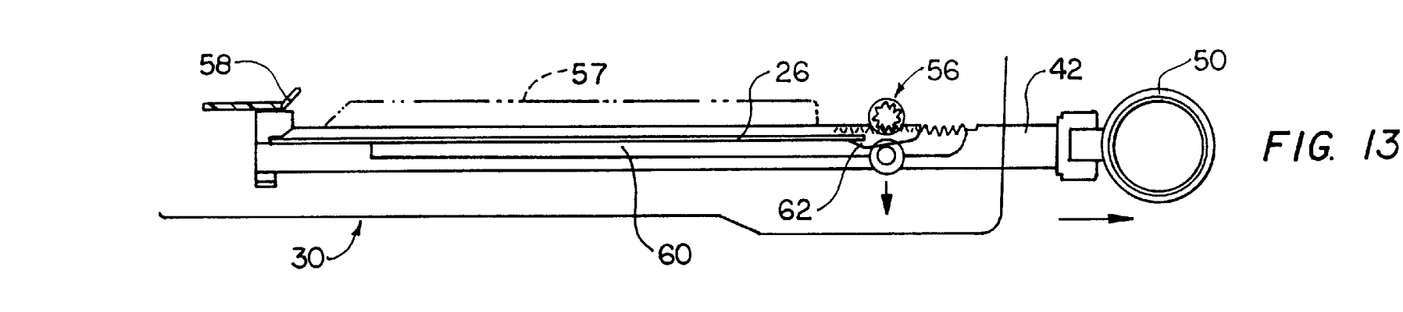
Figure 14:
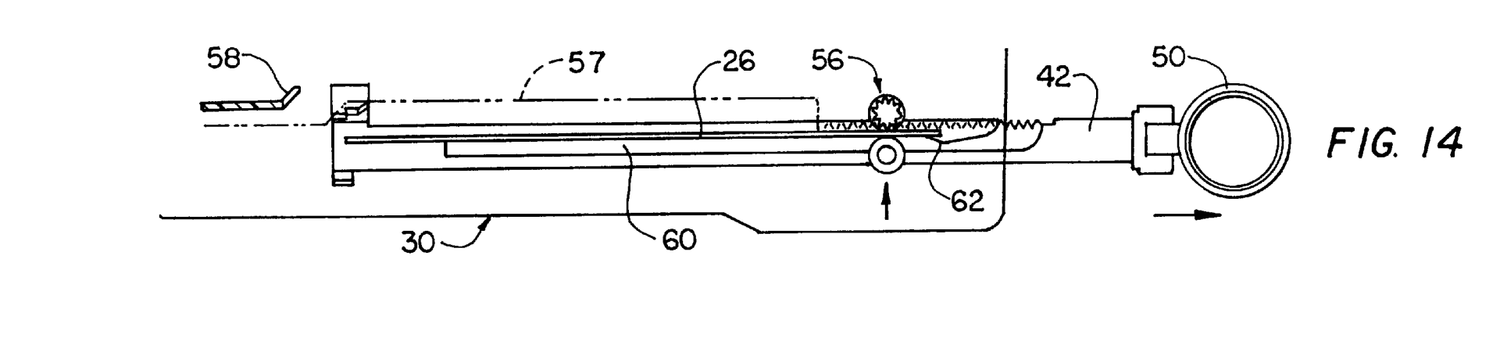
Figure 15:
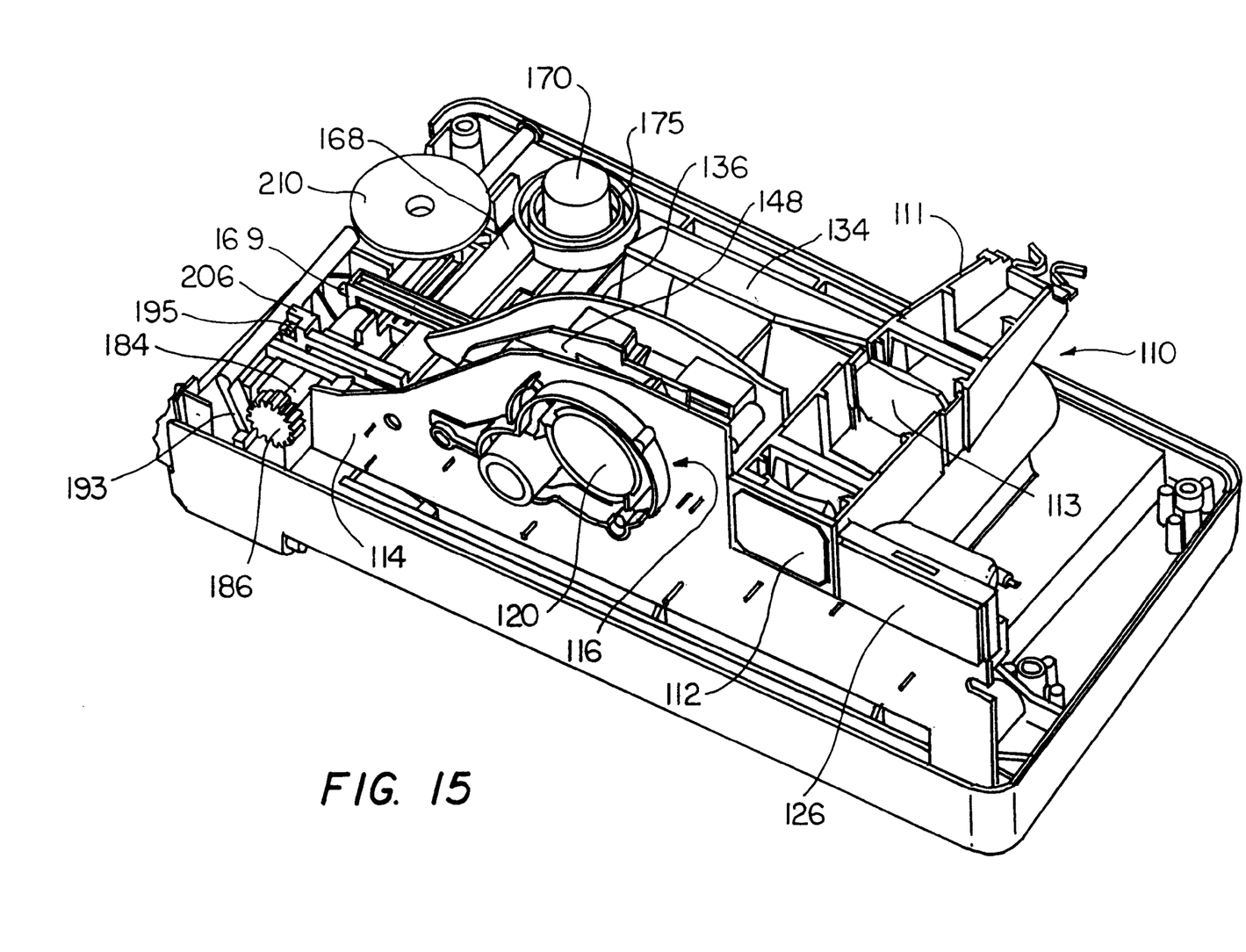
FIGS. 15 and 16 illustrate front and rear perspective views; respectively, of components forming the upper camera assembly.
Figure 16:
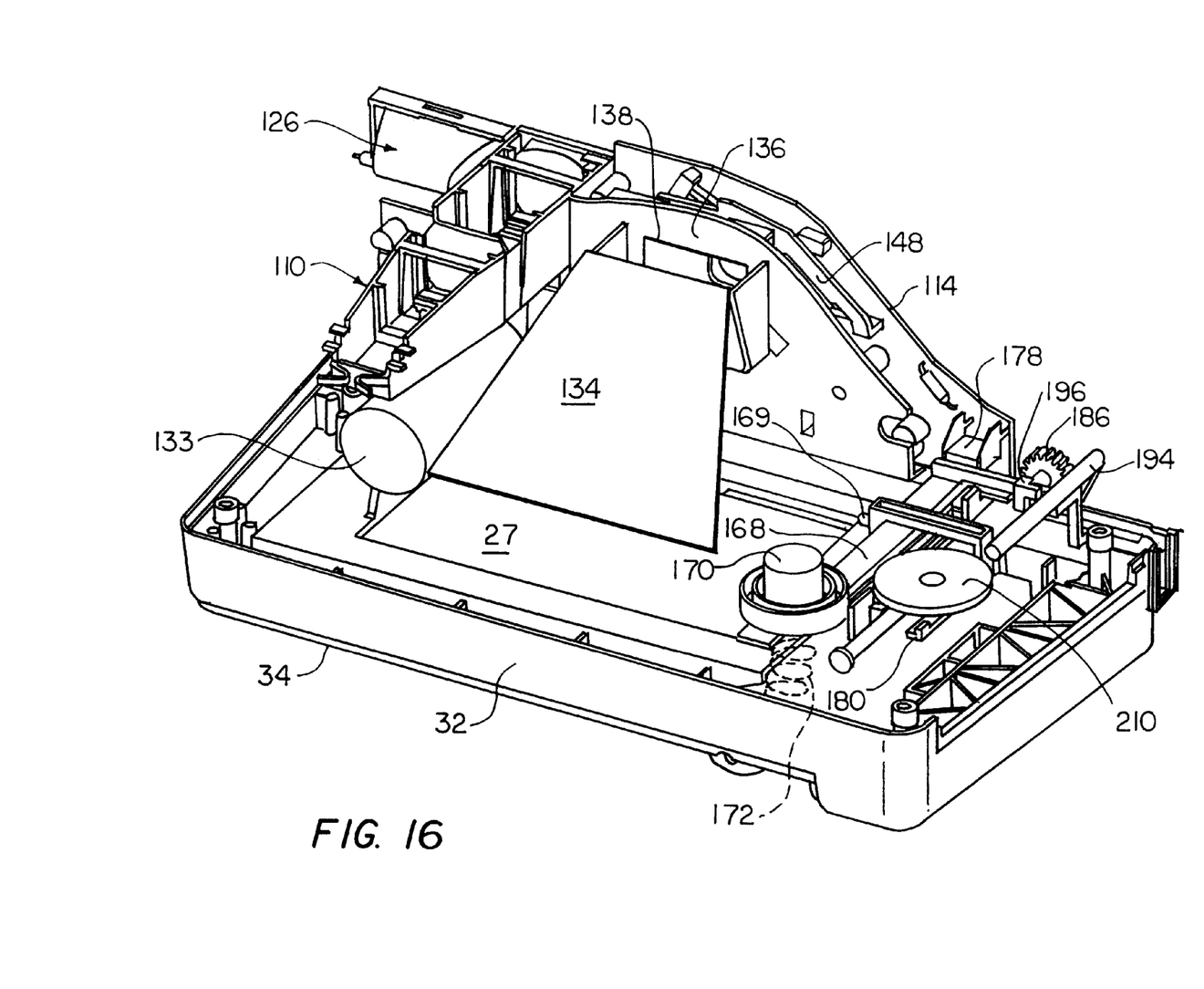

A manually operable and generally elongated film drive processing rack 40 is mounted in the base 32 for reciprocatory movement between inserted and withdrawn positions (see FIGS. 12–14) in response to a user's pulling and pushing efforts. Movement of the drive rack 40 is guided within a channel 42 defined by and between an upstanding inner wall 43 and a side wall 44 and is stopped by suitable structure (not shown) at opposing ends of the base 32. A plurality of gear teeth 46 extend along a portion of the top of the rack and are positioned adjacent a notch 48. A finger ring 50 attached to a leading end of the drive rack allows a user to pull and push on the rack. Although not illustrated, a hand strap can be attached to the ring. The drive rack 40 is provided with a deflectable pick 52 having a proximal end at the trailing end of the drive rack 40 and a tang 54 engageable with the film unit being formed at its distal end. A hook 55 on the drive rack 40 rides on a shelf (not shown) formed along the base 32 in order to guide and retain the drive rack during bidirectional reciprocatory movement. As the drive rack 40 is pulled, the pick 52 engages only the topmost film unit from the stack and drives the same into the nip of a spread roller system 56. After the film enters the nip, the pick 52 is cammed by the top surface 57 for camming the former from engagement with the film unit during the continued stroke of the drive rack. However, the film unit continues to advance through and by the spread roller system as the drive rack powers the spread rollers. Towards this end, the teeth 46 mesh with a drive pinion 58 of the spread roller system 56. Hence, reciprocal rack movement is translated to rotational forces for rotatably powering the spread roller system. As the drive rack 40 is returned to the home reinserted position, the pick engages the cam structure 59, whereby the latter can effect film ejection on the following pull of the rack.

Figure 4:
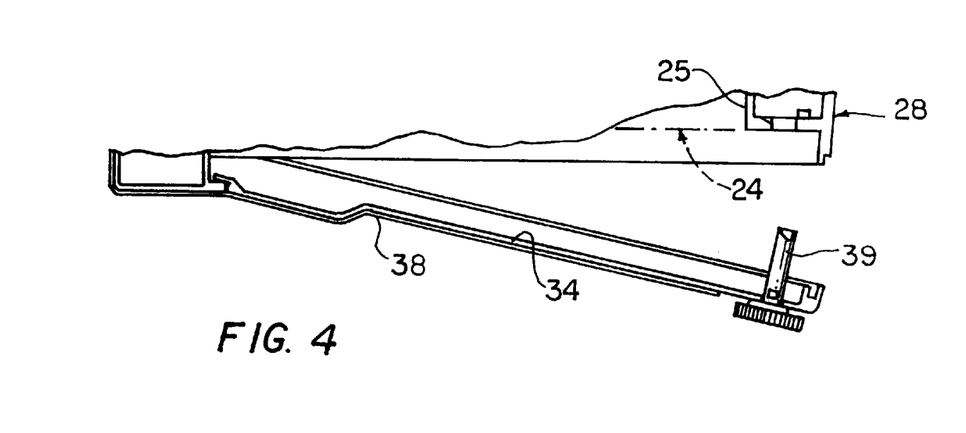
FIG. 4 is an enlarged fragmented view of a camera door assembly.

FIG. 4 illustrates an elongated recess 60 on the inboard lateral surface of the drive rack 40 and a cam 62. The cam 62 engages the spread roller system 38, in a synchronized manner so that a pod 26a of the film unit more easily passes through the nip for reducing the spring biasing forces acting on the film unit by the springs of the spread roller system. Towards this end, the cam 62 engages a shank of the lower roller shaft and drives it downwardly to further widen the nip coincident with a leading edge of the pod 26a entering into the nip. The cam 62 has a profile which allows for it to relatively quickly disengage the shank, thereby allowing the spread roller springs to quickly drive the spread rollers to their original positions following the noted lifting action. This is significant in terms of reducing the forces on the leading edge of the pod and thereby reducing the forces the user encounters in withdrawing the rack. As a consequence, user exerted pulling forces are reduced significantly as the pod passes through the nip. This is advantageous since it makes manual pulling easier for all age groups. To maintain satisfactory engagement of the rack teeth 46 and the drive pinion 58, the top roll has a collar 58a adjacent to the drive pinion 58 which engages a top smooth surface 42a of the rack and maintains a satisfactory gear tooth relationship so as to prevent the teeth from bottoming out and thereby enhance pulling. Although the illustrated embodiment depicts a single cam, at least a second cam spaced from the first can also act on the spread roller system, but synchronously with a trap 26b of the film unit passing through the spread rollers. Accordingly, the second cam reduces the spring forces acting on the trap and concomitantly further reduces the pulling forces required to be exerted. Although the present invention discloses cams on one pulling rack acting under one coil spring, the present invention contemplates having dual racks being pulled and cams being located on each of the racks so as to effect the camming for both the coil springs.

Reference is made back to FIG. 2 for illustrating a known spread roller assembly 56, which can be like that described in U.S. Pat. No. 4,914,711, and which is mounted on the base member 32. Included in the spread roller assembly 56 is a pair of upper and lower spread rollers 70a, 70b mounted for rotation within suitable bearing blocks formed in respective bearing block assemblies 72 each of which is mounted on a corresponding spread roller bracket 75. The drive pinion 58 is journalled to an extension of the upper spread roller 70a and meshes with the teeth 46, so that as the drive rack 40 is displaced it rotates the upper spread roller 70a and which drives the lower spread roller 70b through a pair of conventional meshing gears 74. A pair of coil springs 76 act on the bearing blocks and develop the nip pressure between the spread rollers 70a, 70b necessary for rupturing the pod 26a, spread the processing fluid, as well as drive the film unit. It is the force of the coil springs which the cam 62 counteracts. Each of the spread roller brackets 75 is provided with an opening through which is mounted a shaft 80 of a pre-spreader bar assembly 82. In this manner, the pre-spread assembly 82 is anchored to the spreader rollers for compactly and simply enhancing alignment of the rollers' bite line with a film exit slot 84 formed in the pre-spreader assembly. The assembly 82 is provided a tab 82a and a pad 82b for cooperating with corresponding structure on the bracket 75 for inhibiting rotation of the pre-spreader assembly 82. The pre-spreader assembly 82 has internal surfaces, not shown, forming part of the slot 84 for imparting the desired spreading characteristics to the processing fluid. A film catcher 86 is mounted to the upper housing assembly 30 and, in a known fashion, has its arms 86a engage corresponding edges of the exiting film for urging against the exiting film against a film deflector 87, whereby the film remains held in the camera until manually moved. A flap (not shown) is provided over the exit for inhibiting light-piping along the emerging film unit.

FIGS. 1 and 3 illustrate certain components of the upper housing assembly 30. Essentially, included in the upper housing assembly 30 are front and rearward housing sections 88 and 90; respectively. The housing sections 88 and 90 cooperate with the lower housing assembly 28 to define a light-tight enclosure. The front panel 88 includes a taking aperture 92, a viewfinder aperture 94, a strobe aperture 96, a photocell aperture 98, and calibration aperture 100. An elongated recess 102 in the front panel 88 cooperates in a complementary fashion with a recess 104 formed in the rear panel 90 to determine a slot 106 which allows bidirectional sliding movement of an exposure mode selecting button 108 (FIGS. 8–10) in a manner to be described.

An optical viewfinder assembly 110 includes an elongated viewfinder housing 111 holding in spaced apart relationship positive and negative lenses 113 and 112; respectively. The viewfinder housing 111 cooperates with a circuit board 114 as illustrated. The circuit board 114 is mounted on the supporting wall 136 and functions as a common platform for a variety of hardware and electronic components. A circular lens plate 116 includes a taking aperture 118 and carries an objective lens 120 thereover and positioned along the optical path whereby the aperture 118 is in registry with an aperture in the board 114 for passing image bearing rays to the film plane.

FIG. 3 depicts a strobe assembly 126 mounted on the upper housing assembly and which includes a flash shield 128, an aluminum reflector 130, and a flash tube 132. The strobe assembly 126 includes a capacitor 133 which can be charged by circuitry (not shown) in a number of ways not forming a part of this invention. The upper housing assembly 30 includes a mirror 134 secured along its edges to spaced side walls on the rear panel 90 so as to be positioned along the optical path of the lens 120 for directing incoming scene light to each of the uppermost film units in the stack. An upstanding supporting wall 136 includes a fixed aperture 138 in registration with the aperture 118 and the aperture in the board for allowing scene light to pass to the mirror 134 and to the film unit. A solenoid 140 is mounted to the supporting wall 136 and a spring 142 has one end attached to the supporting wall 136 and the other end of the spring 142 is connected to a shutter blade 144. The shutter blade 144 is mounted on a hub of the supporting wall 136 for pivotal movement between positions for selectively passing and intercepting scene light to the film plane, thereby defining an exposure.

FIGS. 6–10 illustrate a manually operable exposure mode selection switching mechanism 146. The exposure control mechanism 146 includes a carriage 148 having the construction depicted and includes an ambient exposure aperture 150 and a strobe aperture 152. The user selects either a strobe or ambient exposure mode by moving the mode selection button 108 to appropriate corresponding positions, indicated by suitable indicia (not shown), on the upper housing assembly.

Figure 8:
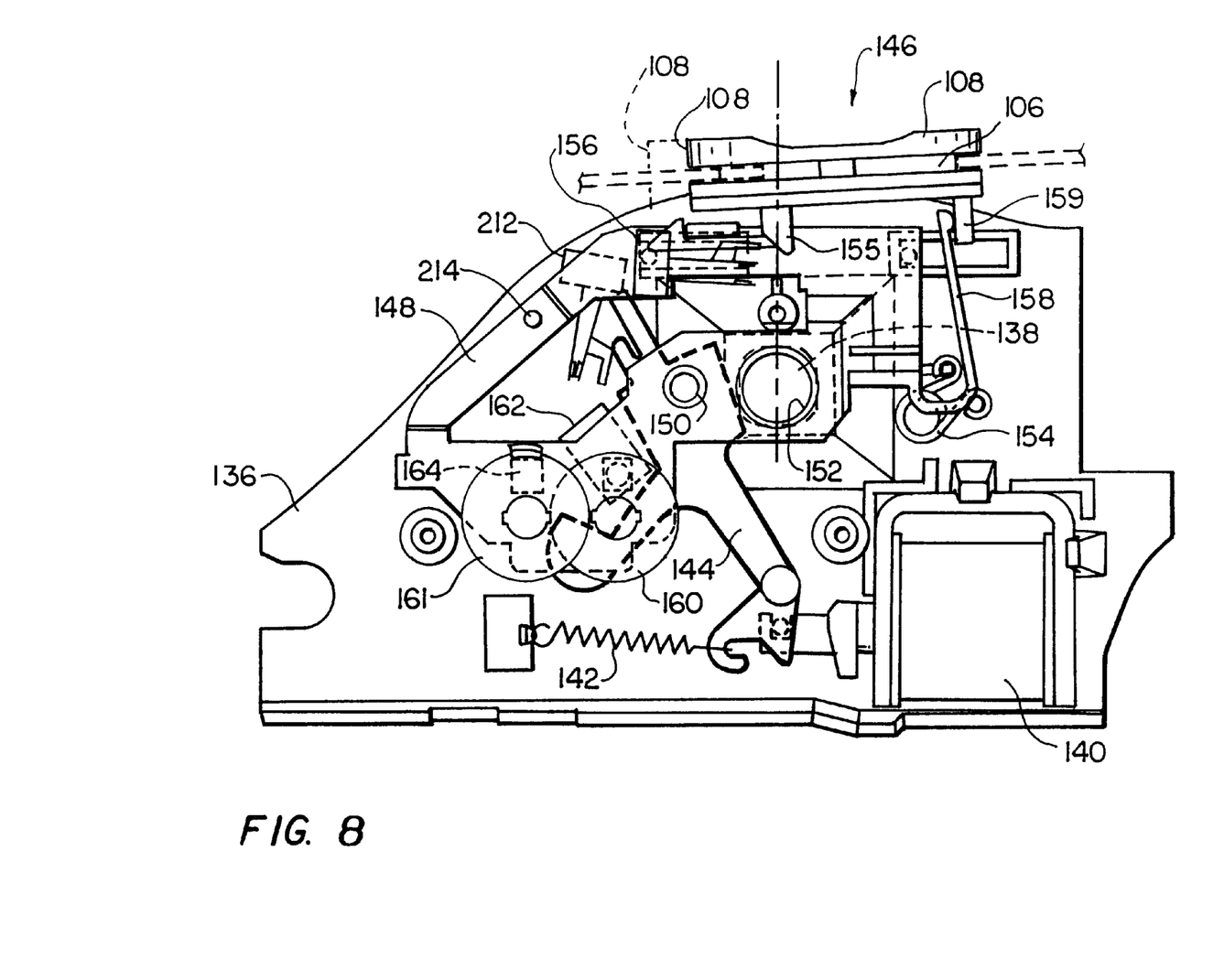
FIG. 8 is an enlarged view illustrating a strobe position of the carriage assembly with a shutter blade in its scene light passing arrangement with respect to an optical taking axis.
Figure 9:
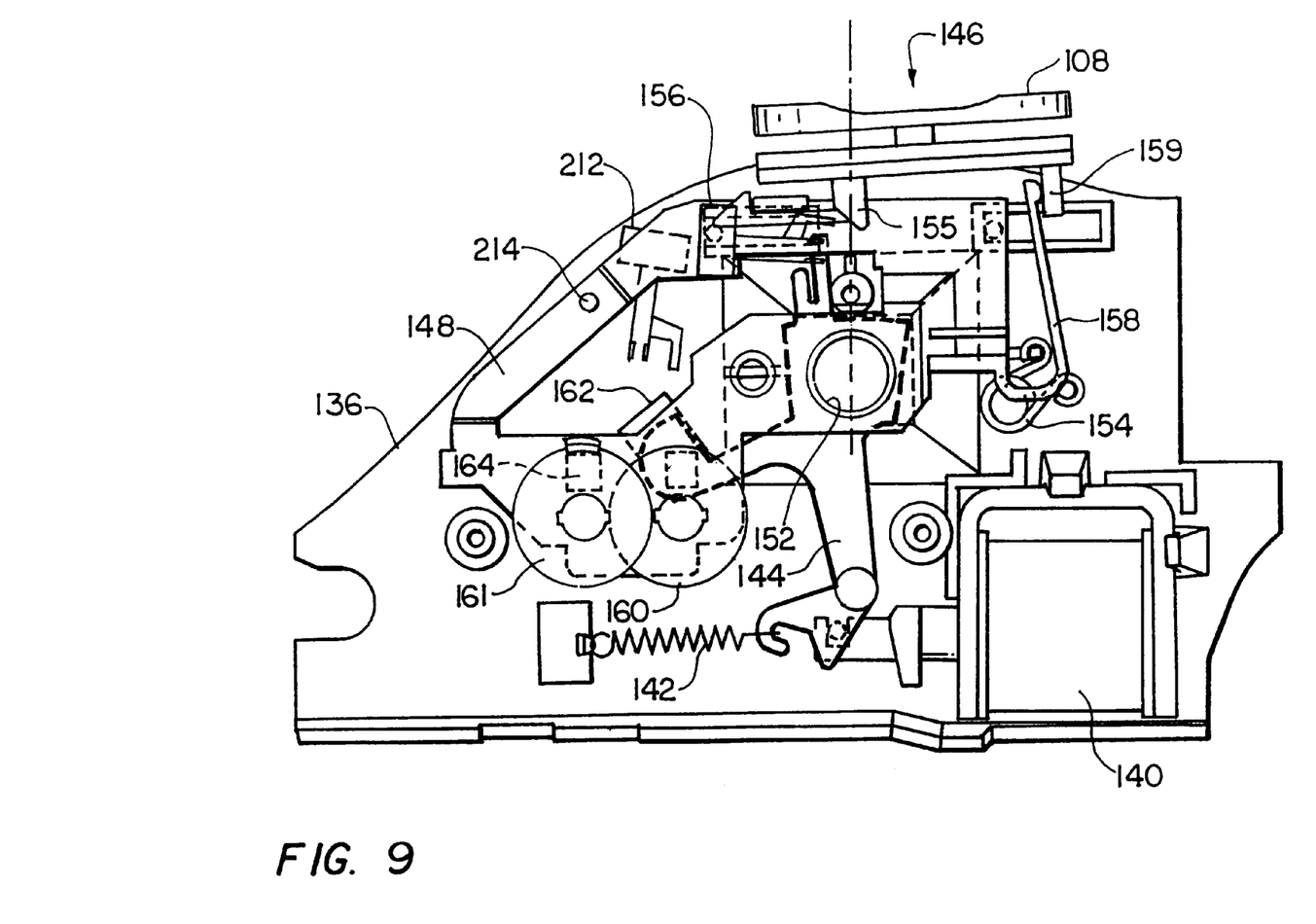
FIG. 9 is an enlarged view similar to FIG. 8, but with the shutter blade in its scene light blocking relationship.

The shutter blade 144 is mounted on the supporting wall 136 for relative movement with respect to the carriage 148 and the taking aperture 138 between scene light passing and intercepting relationships. The carriage 148 is mounted for horizontal movement on the supporting wall 136 by the user sliding the mode selector button 108. The exposure apertures 150 and 152 are selectively moved into and out of the optical path depending on whether the user selects an ambient or strobe mode of operation; respectively. In an ambient mode position (FIG. 10), the aperture 150 is in registry with the aperture 138, and in a strobe mode position, the ambient aperture 152 is in registry with the aperture 138 (FIGS. 8 & 9). An overcenter spring 154 is mounted on the supporting wall 136 and engages a post on the carriage 148 for releasably maintaining the latter in either the strobe or ambient positions, but not in between. It will be appreciated that a detent spring could be appropriately used instead of an overcenter spring. The selecting button 108, when in the strobe mode position, can be further displaced leftwardly to a strobe charging position, see phantom line position in FIG. 8, when the user slides it 108. Towards this end, a cam 155 on the bottom of the button 108 makes the strobe charge switch 156 in order to initiate a strobe charging operation. In this embodiment it is desirable to have the strobe capacitor 133 fully charged prior to commencing exposure in the strobe mode. A strobe charging circuit (not shown) can be of the type which requires the user to maintain the strobe charge switch 156 in the closed position until a neon ready light (not shown) associated with the strobe charging circuit is illuminated; thereby indicating to the user that the strobe is fully charged. Other so-called one touch strobe charging circuits are contemplated.

Returning back to the carriage 148, it includes an integral and upstanding deflector spring arm 158 at one end thereof for engaging a depending post 159 on the mode selecting button 108. When the mode selecting button 108 is moved to the strobe charging position, the post 159 overcomes the biasing provided by the spring arm 158. At the completion of the strobe charging, the user releases the switch button 108 and the deflector spring arm 158 urges the switch button to the strobe mode position (FIGS. 8 & 9).

Figure 6:
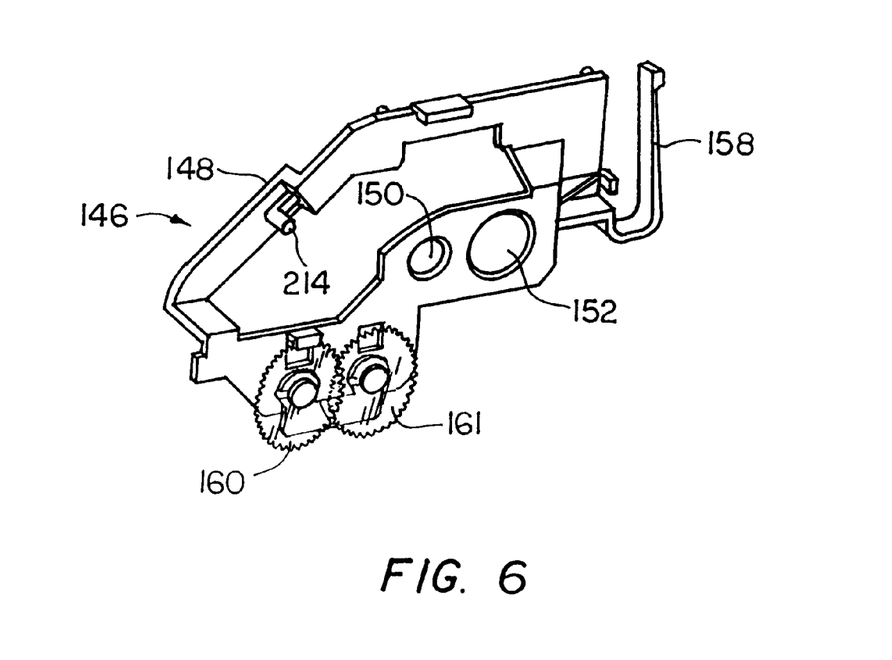
FIG. 6 is a perspective view illustrating a carriage assembly used in an exposure control system.
Figure 7:
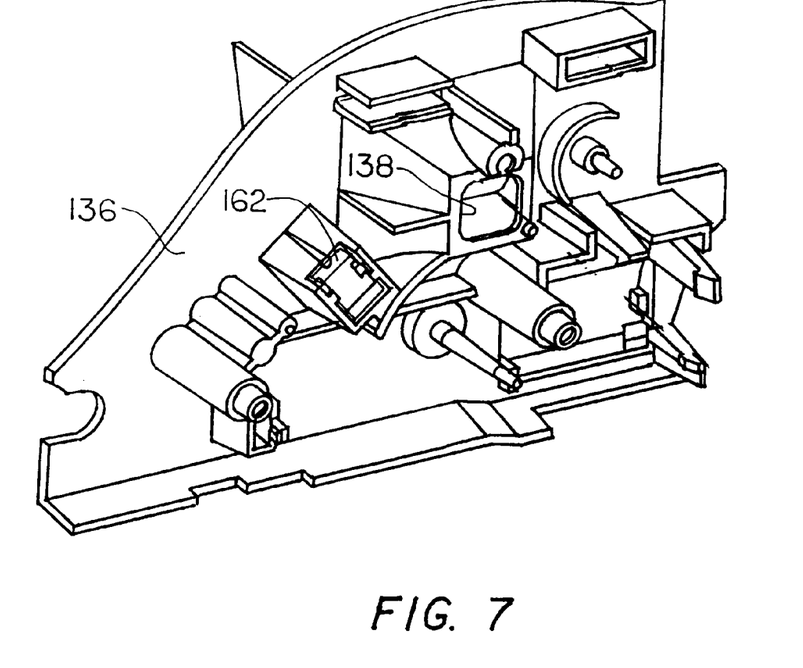
FIG. 7 is a perspective view illustrating a supporting wall for components of the camera including the carriage assembly depicted in FIG. 6.

The carriage 148 also carries a pair of rotatably mounted neutral density calibration disks 160 and 161 placed in registry with respective windows formed in the carriage in order to give the desired exposures in the strobe and ambient conditions; respectively. A phototransducer 162 of the exposure control circuit (not shown) is mounted on the supporting wall 136 of the type which will terminate exposure in both the ambient and strobe modes in manners consistent with cameras of this type. In the strobe mode the strobe fire will be quench upon the exposure control circuit sensing an appropriate amount of scene light. The exposure control system does not, per se, form an aspect of the present invention and, therefore, details thereof have not been presented herein. When the strobe aperture 152 is in the optical path, the calibration disk 160 is positioned over the phototransducer 162, and when the ambient aperture 150 is positioned in the optical path, the calibration disk 161 is positioned over the phototransducer 162. The disks 160 and 161 are, in a well-known manner, rotated at the factory, by tools (not shown) extending through the opening 100 so as to calibrate the response of the phototransducer 162 (FIG.6). An ambient pass optical filter 164 is mounted on the carriage 148 in registry with the ambient calibration disk 160 so as to pass ambient light of the scene to the phototransducer 162.

Figure 11:
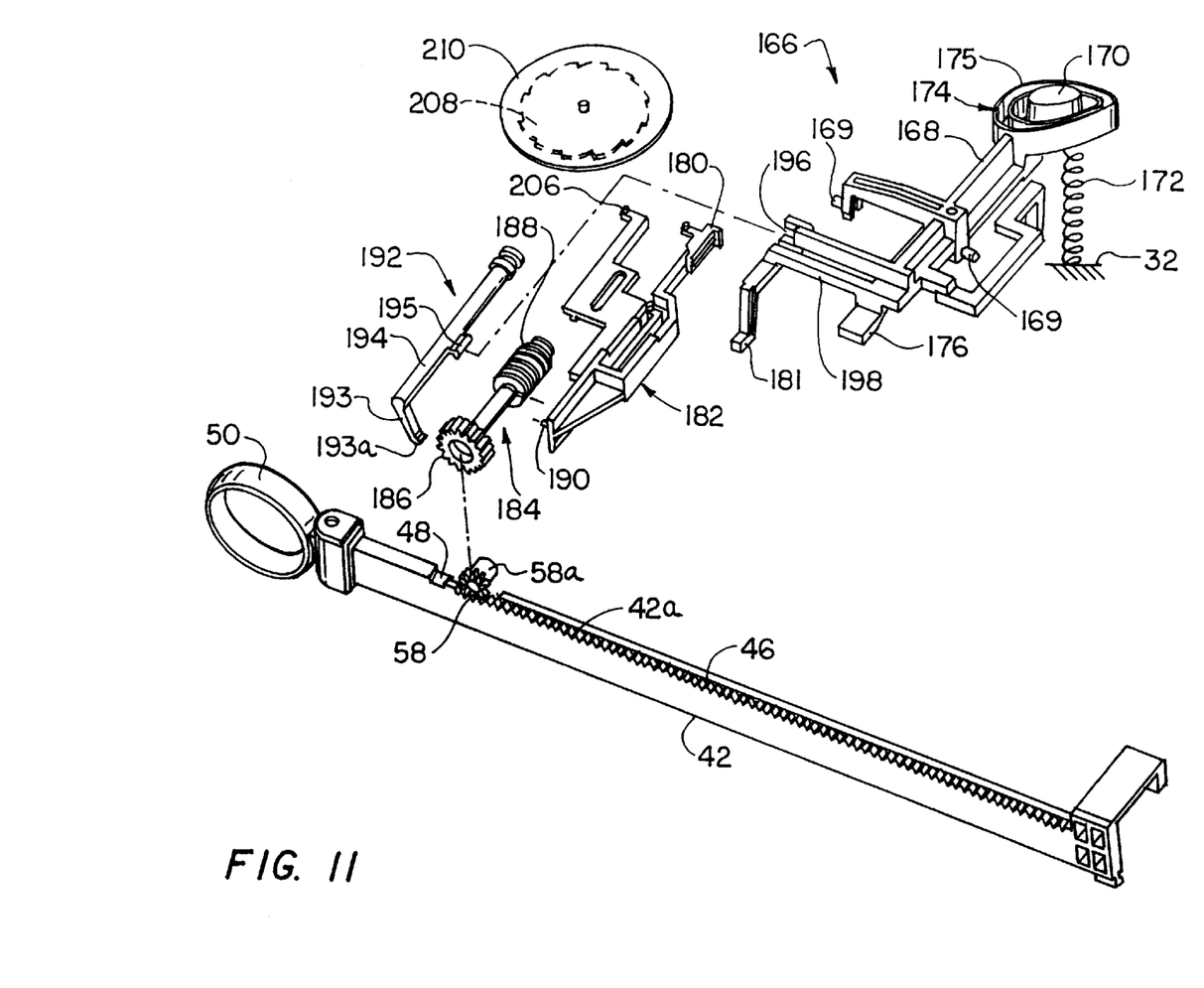
FIG. 11 is an exploded perspective view of one preferred embodiment of an interlocking assembly made according to the present invention.

FIGS. 3 and 11 illustrate an interlock assembly 166 mounted in the camera and operable, as will be explained, for inhibiting: double exposure, double film unit picking, and inadvertent film unit withdrawal, in addition to actively indexing an exposure counterwheel. Essentially, the interlock assembly 166 includes an elongated exposure actuating member 168 having the configuration depicted in the drawings. The exposure actuating member 168 is pivotally mounted at 169 to the base member 32 and has a shutter button 170 at one end thereof accessible through a housing opening 171. A spring 172 on the base block 32 biases the shutter button 170 upwardly. A detent 174 protrudes on one side of the shutter button 170. A baffle 175 surrounds the shutter button and cooperates with complementary structure (not shown) on the inside wall of the upper housing panel 90 for assisting in maintaining a light-tight arrangement. As the user depresses the shutter button 170 for commencing an exposure cycle, a tab 176 on the opposite end of the actuating member 168 is pivoted upwardly and actuates an exposure commence switch 178 which is mounted to the circuit board 114. As will be explained, the detent 174 engages a detenting tooth 180 or teeth if desired on a shuttle member 182 in order to detent the shutter button 170 in the depressed condition against the influence of the spring 172. Thus, this detenting retains the shutter button 170 depressed until the detent becomes disengaged, as will be explained. As a consequence, an operator is inhibited from inadvertently taking a double exposure until completion of a film processing and ejection step. When the actuating member 168 is pivoted, as by depressing the shutter button 170, the actuator foot 181 is lifted from the notch 48, thereby freeing the drive rack 40 for translation. Accordingly, the rack 40 cannot be displaced unless the shutter button 170 is actuated and the foot 181 is concomitantly lifted. Movement of the rack 40 takes place while the shutter button is detented; as noted.

The interlock assembly 166 also includes a timing shaft assembly 184 that is rotatably mounted in the housing assembly and has integrally formed at one end, a pinion gear 186 directly meshing with the teeth 46, whereby the timing shaft assembly 184 is positively rotated by displacement of the drive rack 40. An axially extending helical worm gear 188 at the other end of the timing shaft assembly 184 cooperates with a pin 190 laterally extending from the shuttle member 182. The timing shaft 184 rotates in synchronization with linear movement of the drive rack 40. Also, the direction of rotation is a function of whether the rack is being pulled from the camera or inserted into the camera. The worm gear 188 appropriately drives the shuttle member 182 linearly. Movement of the shuttle member 182 is generally perpendicular to the path of movement of the drive rack 40. A one-way clutch mechanism 192 is provided to prevent movement of the rack until a film unit is completely withdrawn; thereby preventing double film picking. In particular, the clutch mechanism 192 prevents the drive rack 40 from being pushed, inwardly by an operator, back to its original position, until ejection of a picked film unit is complete. By preventing premature rack reinsertion, the film pick cannot reengage the next successive film unit on the stack at the film plane; and thus, the possibility of a second or double picking occurring before the processing of a film unit is prevented. In the illustrated embodiment, the one-way clutch mechanism 192 permits rotation of the timing shaft 184 in one direction which corresponds to withdrawal of the drive rack and which selectively prevents rotation in the opposite which corresponds to reinserting the drive rack into the camera until the clutch is disengaged. In this embodiment, such a clutch mechanism includes a pawl 193 at a distal end of a pawl shaft 194 which is mounted for limited rotational movement. A projection 195 having the configuration depicted is mounted on the shaft within a cradle 196 formed at a distal end of a flexibly resilient arm 198. When the shutter button 170 is depressed, the arm 198 moves upwardly and causes the pawl shaft 194 to rotate slightly through the cradle, whereby a pawl tip 193a is pivoted into engagement of the timing gear pinion 186. The pawl tip 193a prevents reverse rotation of the timing gear 184. As a consequence, the user cannot push in on the rack, after a partial withdrawal thereof, until processing, (i.e., complete drive rack withdrawal) is complete. Hence, the pick cannot be reseated for engagement with the next successive film unit in the stack. Accordingly, the possibility of double picking is obviated since a subsequent pick withdrawal is prevented until processing of the picked unit is complete; as noted above.

The shuttle member 182 is mounted for movement relative on a shuttle support 200 mounted on the base block 32. An upstanding peg 202 of the support rides in a slot formed in the shuttle member for limiting displacement of the latter. The shuttle member 182 moves toward the drive rack when the latter is pulled out and in the opposite direction when the rack is pushed back into the camera. Accordingly when the rack is pulled, the shuttle is advanced such that the tooth 180 disengage the detent, whereby the spring returns the shutter button 172 to its original position; ready for another exposure cycle. As this is occurring, the opposite end of the actuating arm moves upwardly and imparts a slight rotation to the pawl shaft 194, whereby the pawl 192 is rotated out of engagement with the timing gear. As a consequence, the rack 40 is free to be pushed back into the camera. Return of the rack 40 to its original position rotates the timing shaft 182, whereby the shuttle member returns to its original position. As a result, the tooth 180 are positioned adjacent the detent 176 so as to be capable of detenting the shutter button the next time it is depressed. The shuttle member includes a drive pin 206 engaging the ratchet teeth 208 formed on the bottom of a film counter wheel 210 for incrementally driving the latter as the shuttle returns to its original position on each complete pulling of the drive rack. Suitable indicia on the counter wheel 210 corresponds to the number of exposures and can be viewed through a window in the upper housing panel.

After having described the above-noted construction, its operation is believed self-evident. To supplement such description, however, a more detailed explanation follows. At the outset, a user selects either the strobe or ambient modes by moving the mode selector button 108 to one of two appropriate preset positions. If the strobe mode is selected for instance, the carriage 148 will be advanced until the strobe aperture 152 is in registry with the optical path. In this embodiment, in order to charge the strobe, the strobe charging circuit (not shown) is activated by having the user hold the strobe charging switch 156 closed until the capacitor is fully charged. In particular, this occurs when the operator moves the button 108 leftwardly, against the bias of the spring 158, to close the strobe charge switch long enough for a neon ready light (not shown) to be illuminated. Once this occurs, the operator releases the mode selector switch 108 and it automatically returns to the strobe mode position under the action of the spring 158.

Referring back to the strobe mode, the operator depresses the shutter button 170 and the latter is detented by the detent 174, while the actuating member 168 pivots and the exposure commencing switch 178 is closed. This results in the operation of the shutter 144 mechanism, whereby the battery in the cassette energizes the solenoid to retract its plunger. Retraction of the solenoid's plunger drives the shutter blade from a scene light blocking condition (FIG. 9) to a scene light passing situation (FIG. 8), thereby commencing an exposure interval. During shutter blade movement, the shutter blade 144 closes the strobe fire switch 212 for firing the strobe during the exposure interval. The strobe exposure interval terminates when the phototransducer 162 senses the appropriate amount of scene light and appropriate circuitry (not shown) quenches the strobe output as well as deenergizes the solenoid 140. As a consequence of deenergization, the spring 142 drives the shutter blade 144 to its original scene light blocking condition.

Figures 10, 10A:
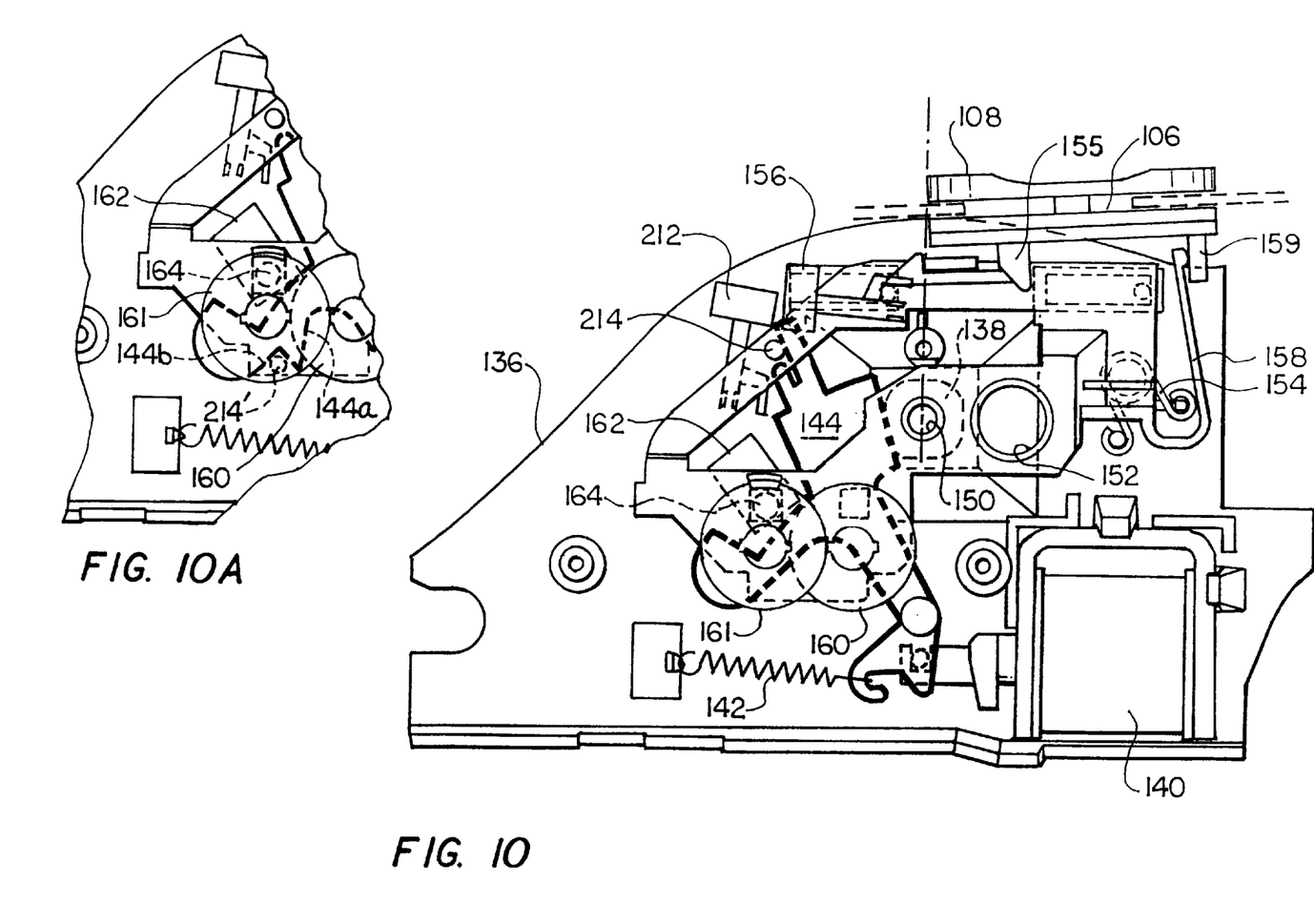
FIG. 10 is an enlarged view illustrating an ambient exposure position of the carriage assembly with the shutter blade in the scene light passing arrangement with respect to the optical axis.
FIG. 10A is an enlarged fragmented view of another embodiment.

If the ambient mode is selected, the carriage 148 is advanced so that the strobe aperture 150 is in registry with the optical axis. The switch 178 is activated upon depression of the shutter button 170 and commences the exposure cycle. The phototransducer 162 senses scene light and upon the proper amount of scene light being evaluated by the exposure control circuit exposure is terminated as by deenergizing the solenoid. The spring 142 drives the shutter blade 144 to its closed position. In the ambient position, however, a post 214 on the carriage 148 engages the shutter blade flag and this inhibits the latter from closing the strobe fire switch 212 during the shutter blade 144 moving to its open position. As depicted in FIG. 10 A, there is shown another embodiment wherein the strobe inhibit switch post 214' is located at a different position on the carriage assembly 148, whereby the post 214' will engage a projection 144a of the shutter in the ambient mode to inhibit strobe firing and another portion 144b when the carriage is in the strobe mode, thereby speeding up the response time by minimizing the exposure time.

Following depression of the shutter button 170, regardless of which exposure mode is selected, the user is free to pull on the drive rack mechanism 40 for extracting a film unit. This is because the rack 40 is free to be translated since the foot 181 rises from the notch 48. As described, manual extraction of the rack effects rotation of the processing rollers for allowing pod rupturing. The spread rollers in known fashion effect spreading of the processing fluid in order to initiate development of the latent image. As the rack is being pulled, the cam 62 acts in reducing the pulling force required to extract or withdraw the film unit from the cassette. This is because the cam 62 is effective to initially engage a shank of the lower roller so that the nip of the spread rollers will create a gap of a predetermined size which will facilitate entry of the film unit between the processing rollers. Accordingly, this additional gap minimizes significantly the pulling forces that would be otherwise be encountered as the film unit enters the nip of the pressure rollers. During continued movement of the rack mechanism, the cam 62 no longer engages the journal of the processing roller 70b, thereby allowing the spring mechanism of the spread roller assembly to exert the required processing forces necessary to rupture the processing pod and spread the fluid dispensed therefrom.

Accordingly, a film unit is picked from the film plane and driven into the nip of the processing rollers 70a and 70b and finally emerge from an exit slot (not shown) formed in the lower housing assembly. As the cam 62 on the rack 40 is being withdrawn, it engages the extension of the shaft of the lowermost roller 70b for driving the latter apart from the upper roller 70a, against the action of the coil springs 76 to create a gap of sufficient dimension to more easily allow the leading end of the trap into the bite of the rollers. When the rack is pulled outwardly, it also drives the processing rollers to spread the processing fluid from the ruptured pod. Pulling is continued until the film unit exits the camera. It will be appreciated that while the rack 40 is pulled, the one-way clutch pawl 192 is active to prevent the timing shaft gear 184 from rotating in one direction because the pawl tip 193a engages the pinion gear 186 to only allow one direction of rotation of the latter, thereby the rack 40 cannot be pushed back into the camera before film processing is complete. The pawl 192 permits the timing gear to rotate in a direction which allows rack pulling. Concomitantly with rack withdrawal, the shuttle is linearly advanced by rotation of the worm gear in a direction, whereby the counterwheel 210 is indexed incrementally corresponding to completion of exposure and processing of a single film unit. In addition, the detenting tooth 176 disengages the detent 174 and the shutter button 172 is free to return to its original position under the influence of the spring for use in another cycle. The actuator 182 pivots back and this drives the pawl 192 to its disengaged position. Consequently, the rack is free to be pushed back into the camera to the home position with the pick in the desired position for engaging another film unit in the cassette. The foot or tab 181 rides on the top surface of the rack until it falls back into the notch 48 for locking the drive rack 40 in its original position. Accordingly, one cycle of operation is complete.

While there have been described what at present are considered to be the preferred embodiments of the present invention, it will be readily apparent to those skilled in the art that various changes may be made therein without departing from the invention, and it is intended in the claims to cover such changes and modifications as fall within the true spirit and scope of the invention.

What is claimed is:

1. A photographic apparatus for use with self-developing film; said apparatus comprising:

a light-tight housing assembly having a film unit exit for allowing the film units to exit said housing assembly;

an exposure control assembly in said housing assembly for effecting an exposure cycle for exposing successive ones of a plurality of the film units stacked in said housing assembly;

said exposure control assembly includes a shutter button;

a spread roller assembly including a spread roller member for defining an nip through which each one of the film units passes for spreading the processing fluid in the film units;

said spread roller member being rotatable for advancing and processing individual film units through the nip towards said exit;

a manually operable drive mechanism is mounted in said housing assembly for bidirectional linear movement and carries a film pick at a proximal end thereof for engaging and advancing a topmost film unit of the film stack into the nip, and for rotatably driving said spread roller member in response to pulling of said drive mechanism by an operator to process the film unit and eject the same from said exit; and, an interlocking assembly cooperates with said shutter button and said drive mechanism to prevent said drive mechanism from moving until said shutter button is actuated, and preventing said drive mechanism from being reinserted into said housing assembly until said drive mechanism has been pulled sufficiently so that a film unit has been processed by said spread roller member and exits said housing assembly;

said exposure control assembly includes a biased carriage assembly movable between ambient, strobe and strobe charge positions in response to manual displacement thereof.

2. The apparatus of claim 1 wherein said interlocking assembly holds said shutter button in its actuated condition until the film unit exits said housing assembly in response to pulling of said drive mechanism.

3. The apparatus of claim 2 wherein said interlocking assembly advances a film counter in response to movement of said drive mechanism.

4. The apparatus of claim 2 further including a detent on said shutter button which cooperates with said interlocking assembly and serves to releasably detent said shutter button in its depressed condition.

5. The apparatus of claim 1 wherein said interlocking assembly includes a pivoting actuating member mounted in said housing assembly and connected at one end thereof to said shutter button, and having a tab at the other end thereof which releasably prevents displacement of said drive mechanism until said shutter button is depressed, said pivoting member pivots said tab out of engagement with said drive mechanism, thereby freeing said drive mechanism for displacement.

6. The apparatus of claim 5 wherein said drive mechanism includes a series of teeth thereon and a notch for receiving said tab in order to prevent displacement of said drive mechanism.

7. The apparatus of claim 1 wherein said spread roller assembly includes a gear in meshing engagement with said teeth on said drive mechanism, whereby bidirectional displacement of said drive mechanism bidirectionally drives said gear and said spread roller assembly.

8. The apparatus of claim 6 wherein said interlocking assembly includes a one-way clutch mechanism operable for selectively cooperating with said gear to permit pulling of said drive mechanism and to selectively prevent pushing of said drive mechanism into said housing assembly.

9. The apparatus of claim 8 wherein said clutch mechanism includes a pawl which prevents rotation of said gear whenever in engagement therewith.

10. The apparatus of claim 7 wherein said interlocking assembly includes a shutter assembly and a timing gear operably cooperable with said rack teeth and bidirectionally rotatable in response to bidirectional displacement of said drive mechanism between first and second positions, whereby whenever said shuttle assembly is in said first position it cooperates with said detenting mechanism and whenever in said second position is free of said detenting mechanism.

11. The apparatus of claim 1 further including means for enlarging the nip defined by said spread roller assembly so as to reduce forces acting on the film unit passing through the nip.

12. The apparatus of claim 11 wherein said nip enlarging means includes at least a camming member on said drive mechanism which engages and displaces said one spread roller in a manner to enlarge the nip at least prior to a processing fluid pod of the film unit entering the nip.

13. The apparatus of claim 1 further including a spectral filter mounted on said carriage assembly and arranged so as to be in overlying relationship with a transducer of said exposure control assembly when in said ambient position.

* * * * *